United States Patent [19]

Prieb

[11] Patent Number: 4,486,300

[45] Date of Patent: Dec. 4, 1984

[54] SPECIFIC GRAVITY GRAIN GRADER

[76] Inventor: William Prieb, Box 86, Lang, Saskatchewan, Canada, S0G 2W0

[21] Appl. No.: 411,434

[22] Filed: Aug. 25, 1982

[30] Foreign Application Priority Data

Sep. 1, 1981 [CA] Canada .................................. 384950

[51] Int. Cl.[3] ......................... B07B 4/02; B65G 65/32

[52] U.S. Cl. .................................... 209/135; 209/137; 209/143; 209/145; 209/149; 209/638; 209/910; 209/922; 141/286; 414/160; 414/293

[58] Field of Search ................................ 209/134–137, 209/142, 143, 146, 149, 910, 638, 922, 145; 141/286; 414/160, 293

[56] References Cited

U.S. PATENT DOCUMENTS

| | | | |
|---|---|---|---|
| 645,442 | 3/1900 | Tromanhauser | 209/137 |
| 1,068,006 | 7/1913 | Pottinger | 414/293 |
| 2,129,451 | 9/1938 | Talmage | 209/137 |
| 2,828,011 | 3/1958 | Whitby | 209/135 |
| 3,087,615 | 4/1963 | Powell | 209/134 |
| 3,397,780 | 8/1968 | Beuzeval | 209/143 |
| 3,400,816 | 9/1968 | Hedley | 209/135 |
| 3,878,091 | 4/1975 | Hokki | 209/143 |
| 3,945,511 | 3/1976 | Delorme | 414/293 |
| 4,252,485 | 2/1981 | Propster | 414/160 |

FOREIGN PATENT DOCUMENTS 473532 9/1975 U.S.S.R. ............................. 209/146

*Primary Examiner*—David L. Lacey
*Attorney, Agent, or Firm*—Stanley G. Ade

[57] ABSTRACT

In a grader device grain is fed down a slide which ejects the grain outwardly and forwardly into an airstream. The slide is provided by a resilient flexible sheet, the contour and inclination of which is adjusted by a plurality of support rods against which the sheet presses and the positions of which are adjustable. A plurality of transverse collecting troughs with adjustable baffles, receive the separated grains according to the weight thereof with the top quality grain being heaviest, collecting in the forward trough. A suction fan extracts dust before it reaches the main airstream and diverts it into a cyclone or the like. Accurate airstream control is achieved by a plurality of adjustable wind boards strategically situated within the grader device. An even dispersal device receives the grain from a storage facility and ensures even distribution of the various weights of grain, straw and chaff prior to it being fed to a hopper which delivers the grain to the slide thus avoiding the undesirable side separation in the hopper which occurs when a relatively large quantity of grain flows into and through a hopper.

25 Claims, 5 Drawing Figures

18
30
31
17
29
16
19
26
20
21
23
22
27
25
24
49
28
52
58
51
47
46
65
63
45
48
55
53
54
12
58
57
50
56

64
60
74
75
61
71
62
59
77
73
72
77
77
85
76
66
85A
67
69
81
13
79
80
68
11
10
14
15
83
84
78A
78
82
15
70

SPECIFIC GRAVITY GRAIN GRADER

BACKGROUND OF THE INVENTION

This invention relates to new and useful improvements in grain graders and cleaners, particularly graders and cleaners operating on a specific gravity principle.

Although it is designed primarily for use by the individual farmer prior to delivery of grain to the elevator, nevertheles of course it will be appreciated that it can be used under other circumstances as desired.

It is particularly suitable for use with grain, some of which has been badly frozen. It improves the sample of grain by removing and/or separating the frozen, cracked, dehydrated, sprouted, or deformed kernels as long as it is of the same variety.

Conventionally, a sample is taken at the grain elevator and dockage is assessed against the main bulk of the delivery which is then cleaned by the elvator with the dockage remaining with the elevator owner.

The present grader will improve the sample of grain by removing the undesirable kernels thus enabling the farmer to deliver a better looking grade of grain to the elevator and to receive the price for the grain in each grade. It also enables the farmer to retain the lower grades and dockage which can be sold for livestock feed or be used by the farmer for a similar purpose.

It also enables dust, straw, chaff and the like to be removed and, when used upon frozen grain, grades the heavily frosted grain in the same sample which is not classed as dockage. Furthermore it is excellent in separating sprouted grain from the original grade as sprouted wheat, for example, has lost its weight but not its size. The cleaner will also separate mixed grain, such as barley from wheat, flax, oats, etc. and any grains that have a different specific gravity, such as wheat 60–65, barley 48–52, oats 28–35.

In accordance with the invention there is provided a specific gravity seed grader comprising in combination an enclosure, a plurality of separate grain collector means situated transversely across the base thereof, a source of wind at the front of said enclosure for providing an airstream therethrough, an air exit through the wall of said enclosure remote from said source of wind, grain hopper means operatively connected with adjacent the upper side of said enclosure, a downwardly and rearwardly inclining grain slide extending from and communicating with said grain hopper means, for depositing grain into the airstream, and control means within said enclosure for the movement of grain into and through said airstream.

Another advantage of the invention is that full adjustability may be provided depending upon the grain sample being cleaned or graded and includes means whereby an evenly distributed non-turbulent air flow passes through the enclosure so that the separation is only by weight and not affected by any wind turbulence.

A yet further advantage of the invention is to provide a device of the character herewithin described which includes sieves or screens or pocketed wheels so that maintenance is at a minimum and replacement parts almost non-existent.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

BRIEF DESCRIPTION OF THE DRAWINGS

In the drawings like characters of reference indicate corresponding parts in the different figures.

DETAILED DESCRIPTION

Figure 1:
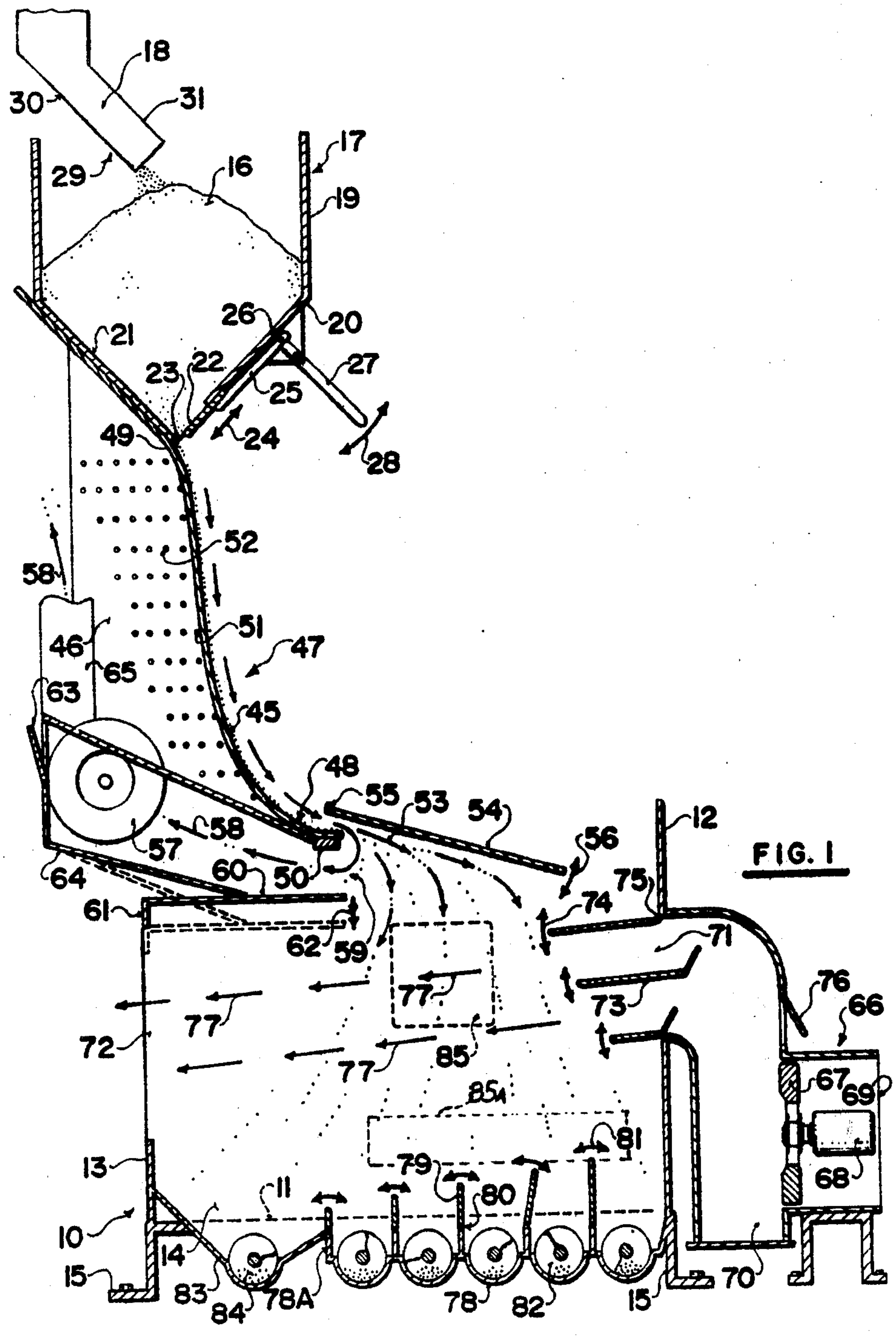
FIG. 1 is a partially sectioned, partially schematic side elevation of the preferred embodiment.

Proceeding therefore to describe the invention in detail, reference should first be made to FIG. 1 in which 10 generally indicates an enclosure including a base 11, a front wall 12, a rear wall 13 and a pair of spaced and parallel side walls 14.

The enclosure may be supported upon supporting structure such as legs 15.

Grain indicated by reference character 16, is fed to a hopper 17 from a spout 18 or the equivalent, from a source of supply (not illustrated). The hopper includes the vertical walls 19 and inwardly and downwardly inclining front and rear base panels 20 and 21 respectively, it being understood that these sloping base panels extend across the full width of the hopper 17.

An adjustable gate 22 extends between the lower inner end of the base panel 20 and the lower inner end of the base panel 21 thus defining a transversely extending feed slot 23. The adjustment may be by any convenient means such as sliding the gate 22 in the direction of the double headed arrow 24 or by pivoting a lever 25 extending from the gate, as at 26 and having an actuating lever 27 movable in the direction of double headed arrow 28 to widen or narrow the cleaning slot 23.

Figure 3:
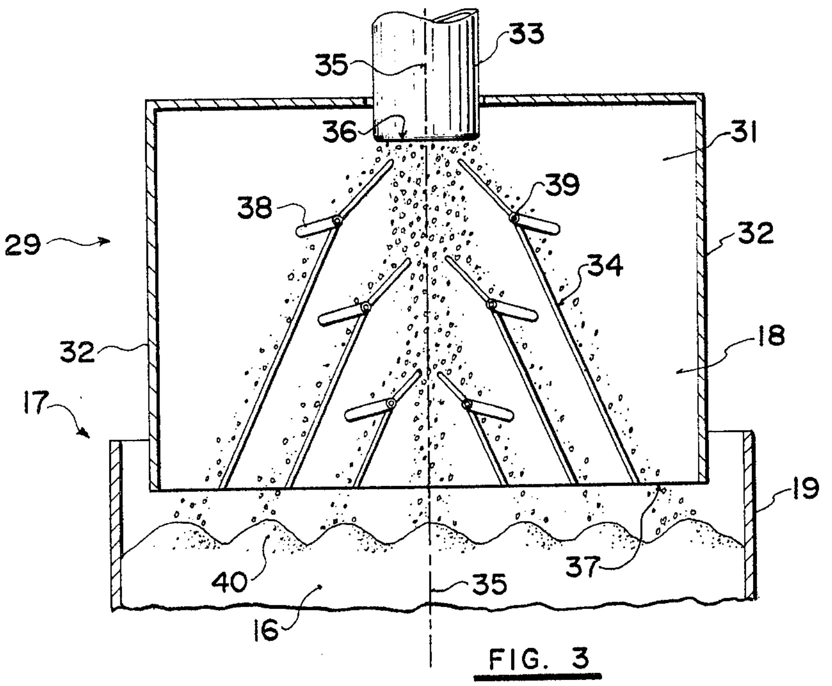
FIG. 3 is a fragmentary cross sectional front elevation of the even dispersal assembly.

Spout 18 which extends transversely of the hopper 17, forms the outlet of an even dispersal assembly collectively designated 29 and shown in FIG. 3. It is a well known fact that after a considerable quantity of one type of grain is fed through a hopper, the heavier grain tends to flow centrally of the transverse exit with the lighter grain becoming situated at the two side extremities together with a build up of chaff or straw above the pile of grain at the side. This is obviously undesirable in an air type grader or separator as the density of the curtain of grain falling into the wind stream, as will hereinafter be described, should be as even as possible in order to affect proper gravity separation.

The even dispersal device consists of a transversely extending, rectangularly cross sectioned spout 18 having a base panel 30, an upper panel 31 and a pair of relatively shallow side panels 32. Grain from the source of supply is fed to the upper end of the spout 18 through a further spout 33 shown in FIG. 3. A plurality of separators 34 diverge outwardly upon either side of center line 35, from the exit 36 of the spout 33 to the exit 37 of the spout 18, dividing the entering of grain evenly across the width of the even dispersal spout 18 controlled by adjustable gates 38 pivoted to the separators 34 as at pivot points 39. The gates operate between adjacent partitions to control the even dispersal of grain which deposits within the hopper 17 in a plurality of even piles as indicated by reference character 40 from where it passes through the feed slot 23 in an even stream transversely of the hopper and having a relatively similiar density thereacross.

Figure 4:
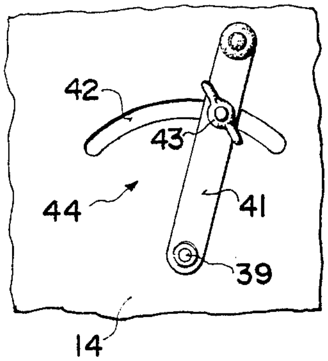
FIG. 4 is a fragmentary front elevation of a typical board or bleed off control.

Reference to FIG. 4 will show a typical method of adjusting gates 38 which consists of the pivot point 39 having an externally situated lever 41 movable in an arc defined by an arcuate slot 42 and being selectively clamped in the desired position relative to the slot by means of a wing nut 43. This type of adjustment is collectively designated 44 and is referred to for other gates and bleed off panels.

Figure 2:
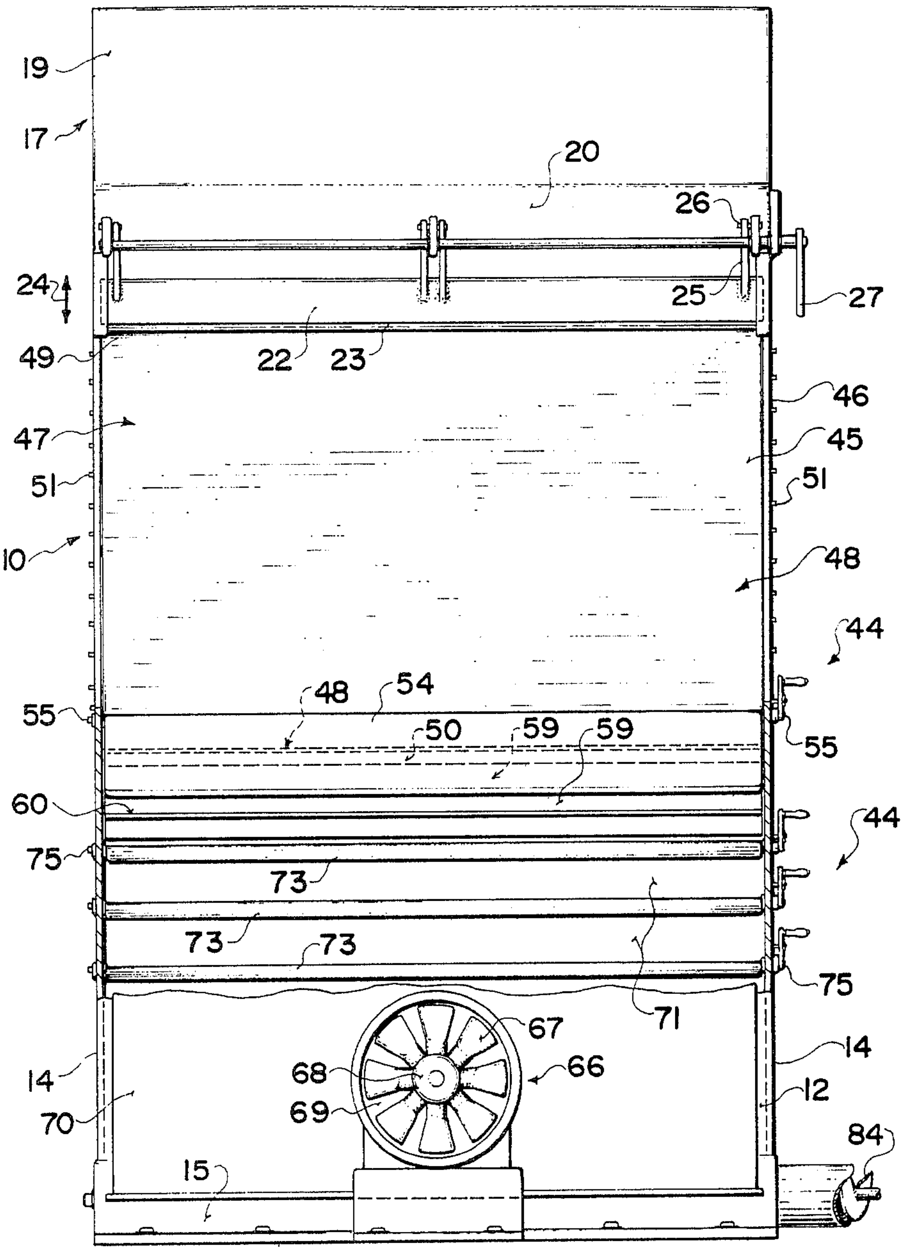
FIG. 2 is a partially schematic, partially cross-sectioned front elevation taken from the right hand side of FIG. 1.

A grain slide panel 45 extends from the feed slot 23 to within the upper side of the enclosure 10 adjacent the rear wall 13 thereof and this slide extends transversely between a pair of vertical sides 46 extending from the upper side of the rear of the enclosure 10, to the rear sloping face wall 21 of the hopper. The grain slide panel 45 is preferably formed from flexible steel or plastic and is resilient and is adjustably positioned within limits to form a downwardly sweeping main surface portion collectively designated 47 and a forwardly extending discharge portion collectively designated 48 adjacent the lower end thereof. The upper end 49 of the panel 45 is secured adjacent to the lower end of the rear sloping wall 21 of the hopper so that all grain passing through the feed slot 23 is deposited upon the downwardly and forwardly extending grain slide 45. The lower end portion 48 of the grain slide is provided with a transverse strap or member 50 and is secured between the lower ends of the side panels 46 by conventional means. The angle of inclination and contour of the grain slide is controlled within limits by a plurality of transversely situated rods 51 extending between the sides 46 and engaging any one of a plurality of apertures 52 formed therethrough. With the upper and lower ends of the sheet anchored, the resilient flexibility of the sheet forces it against the rods 52 thus following a contour controlled by the rods depending upon their position within the plurality of selected apertures 52. It is essential that the lower discharge end area 48 is in the form of a shallow curve relative to the main portion 47 so that the discharge end discharges grain towards the front end 12 of the enclosure as indicated by the arrow 53. In this connection a transversely extending wind board 54 is pivoted between the sides 14 of the enclosure as indicated by reference character 55 and extends towards the front wall 12 being adjustable by means of an adjustor 44 (shown in FIG. 2) in the direction of double headed arrow 56. This wind board extends the full width of the enclosure and controls the direction of discharge of the grain from the lower end of the grain slide 45.

A dust extractor fan assembly collectively designated 57 is situated within the rear wall 13 of the enclosure adjacent the upper end thereof with a source of power (not illustrated) being provided to extract air from the enclosure in the direction of arrow 58. The intake for the extractor fan assembly 57 is indicated by reference character 59 and is immediately below the discharge area 48 of the grain slide. A wind board 60 controls the intake depth, being mounted for sliding movement at 61 in the direction of double headed arrow 62 and being held in position by an adjustor 44.

The actual velocity of the extractor air through the intake 59 is controlled by an adjustable bleed off panel 63 at the rear of the fan casing 64. The dust and the like which is extracted by the fan 57 passes through outlet 65 to a cyclone or similar apparatus (not illustrated).

The main separator airstream is provided by a pressure fan assembly collectively designated 66 and situated at the front of the enclosure. It is conventional in construction and includes fan blades 67 operated by a source of power such as an electric motor 68 and discharges air under pressure from an intake 69, to a pressurizing manifold 70 situated between the fan assembly 66 and the front wall 12 of the casing. From there it passes through an intake area 71 in the front wall 12, it being understood that the manifold 70 and the intake area 71 extends the full width of the assembly. The air passes substantially horizontally through the enclosure and exits through an air exit aperture 72 spanning the full width of the enclosure and being situated within the rear wall 13 thereof. A plurality of transversely extending wind boards 73 are pivoted within the intake area 71 and may be moved in the direction of arrows 74 around pivots 75 controlled by adjustors 44 thus enabling a relatively stable airstream to pass through the enclosure evenly distributed and with the minimum of turbulence. Although the basic speed of this airstream is controlled by the fan assembly 66, nevertheless a bleed off panel is provided at the rear of the pressurizing manifold 70, identified by reference character 76 and controlled by an adjustor 44 to give limited control of the speed of the airstream.

The operation of the device is as follows:

The grain to be graded, separated and cleaned, is fed to the hopper through the even dispersal device 29 as hereinbefore described and the flow of grain from the hopper 17 is controlled by the flow gate 22 so that it passes down the grain slide 45 in the form of a curtain of grain spanning the full width of the grain slide and the enclosure. It is ejected rearwardly from the lower end area 48 of the grain slide with dust and very light chaff being extracted by the dust extractor fan 57, with the remainder of the grain being ejected towards the front wall 12 and into the air stream indicated by arrows 77, passing from the air intake 71 in the front wall 12 and exiting through the exit 72 in the rear wall 13. By controlling the speed of the air and the speed of ejection of the grain from the grain slide, the heaviest kernels will travel farthest towards the front wall 12 with the successively lighter kernels separating by the weight thereof, in bands, towards the rear wall 13 thus giving an efficient specific gravity separator for the grain entering the enclosure 10. Collector troughs 78 are situated in spaced and parallel relationship transversely across the base 11 of the enclosure 10 with adjustable separators or divider boards 79 extending upwardly from the upper edges of adjacent troughs. These are pivoted through the upper edges as indicated by reference character 80 and are adjustable by adjustors 44 as hereinbefore described. They are movable in the direction of double headed arrows 81 so that some control of separation is affected. The troughs may be provided with clean out augers 82 driven by a source of power (not illustrated) to remove the various grades of grain collected in the main troughs 78. A rear trough 83 extends from adjacent the rearmost trough specifically designated 78A and the rear wall 13 to collect straw, broken grain and other relatively light debris. A clean out auger 84 may be provided for this clean out trough.

By controlling the discharge slot 23 and the inclination of the grain slide 45, together with the various wind boards and speed of the airstream 77 and the dust extractor assembly 57, efficient separation of the grain by specific gravity may be accomplished with the final adjustment being the separators 79. It is adaptable for use with many types of grain and the operation can be viewed through a window indicated schematically by reference character 85 situated in one of the side walls 14. A further window or sight glass 85A, made of safety glass, may be provided in one of the side walls just above the augers 78, 82, etc. so that the wind patterns of the grain can be studied and any necessary adjustments can be made.

Figure 5:
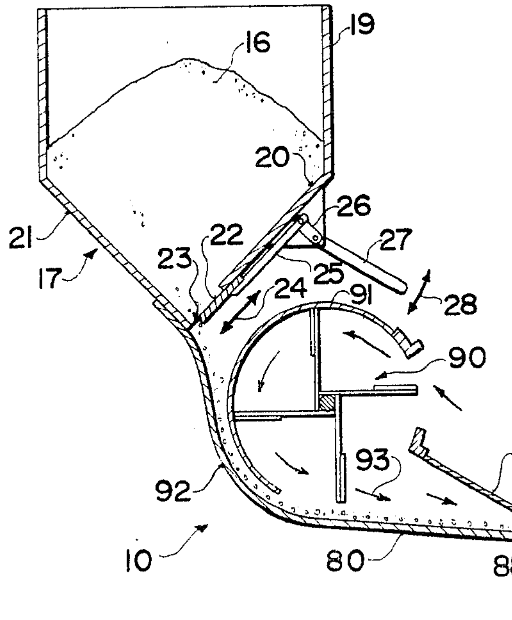
FIG. 5 is a fragmentary partially sectioned side elevation of an alternative feed mechanism for the grain from the hopper.

FIG. 5 shows an alternative construction in which the grain slide 45 is much shallower and indicated by reference character 80. The discharge end 87 is provided with a transverse member 88 supported upon a transverse rod 89 extending between the sides 14 of the enclosure. The grain 16 passing from the hopper 17 through the feed slot 23, is ejected into the airstream of the enclosure by a fan assembly collectively designated 90 situated within a transverse casing 91 and driven by a source of power (not illustrated). The grain flows from the feed slot 23, down a curved sloping part 92 and through an intake area defined by the curved part 92 and a curved casing 91 of the fan assembly 90 which creates an airstream indicated by arrows 93 which picks up the grain and ejects it forwardly. A wind board 94 is provided above the panel 86 and adjacent the discharge end 87.

Control of the feed slot 23 is by a manner similar to that described previously with the gate 22 being movable in the direction of double headed arrow 24 by means of lever arms 27 pivoted as at 26 and movable in the direction of arrow 28.

It should be noted that the fan assembly 90 is in the form of a paddle fan with the ends closed but with the front and bottom side open so that the blades do not come in contact with the grain but which provides an air flow which gives it a driving force into the main airstream indicated by arrows 77.

Large, heavy and good quality kernels of grain travel further towards the front wall 12 and frozen, deformed, burnt, sprouted and heated grain fall short depending upon the weight thereof thus allowing efficient separation into various grades.

Since various modifications can be made in my invention as hereinabove described, and many apparently widely different embodiments of same made within the spirit and scope of the claims without departing from such spirit and scope, it is not intended that all matter contained in the accompanying specification shall be interpreted as illustrative only and not in a limiting sense.

What I claim is:

1. A specific gravity grain grader comprising in combination an enclosure, a plurality of separate grain collector means situated transversely across the base thereof, a fan assembly positioned and arranged to generate an airstream which passes longitudinally through said enclosure, an air inlet through one wall of the enclose and an air exit through another wall of said enclosure opposite to said inlet, grain hopper means operatively connected with the enclosure adjacent an upper side thereof, a downwardly and horizontally inclining grain slide extending from and communicating with said grain hopper means for depositing grain into the airstream in a direction generally opposite thereto whereby the grain is separated by said airstream into respective ones of said grain collector means, wherein said grain slide comprises a flexible resilient sheet which is inclined and contoured so as to span said enclosure and secured by an upper end thereof adjacent a discharge of said grain hopper means, means for anchoring a lower end of said sheet to said enclosure and a plurality of spaced and parallel transversely extending rods spanning said enclosure under said sheet and being individually adjustably positionable within said sides of said enclosure, the resiliency of said sheet maintaining same against said rods, whereby adjustment of the position of the rods acts to control the angle of inclination and contour of the sheet.

2. The grader according to claim 1 which includes baffles positioned and arranged to separate each of said grain collector means from the next adjacent grain collector means, the baffles being adjustable in a direction longitudinally of said base.

3. The grader according to claim 2 which includes a separator dust extractor assembly operatively connected to said enclosure adjacent the air exit thereof and adjacent to the lower end of said grain slide.

4. The grader accordng to claim 3 in which said grain collector means comprises a trough with the troughs arranged in spaced and parallel relationship spanning the base of said enclosure, and an auger assembly in each of said troughs for removing grain therefrom.

5. The grader according to claim 4 including adjustable baffle means for controlling the direction of the airstream and bleeder means to control the velocity thereof.

6. The grader according to claim 4 in which said separator dust extractor assembly includes bleeder means for controlling the effective efficiency thereof.

7. The grader according to claim 3 including adjustable baffle means for controlling the direction of the airstream and bleeder means to control the velocity thereof.

8. The grader according to claim 3 in which said separator dust extractor assembly includes bleeder means for controlling the effective efficiency thereof.

9. The grader according to claim 2 in which each said grain collector means comprises a trough with the troughs arranged in spaced and parallel relationship spanning the base of said enclosure, and an auger assembly in each of said troughs for removing grain therefrom.

10. The grader accordng to claim 2 including adjustable baffle means for controlling the direction of the airstream and bleeder means to control the velocity thereof.

11. The grader according to claim 1 which includes a separator dust extractor assembly operatively connected to said enclosure adjacent the air exit thereof and adjacent to the lower end of said grain slide.

12. The grader according to claim 11 in which each said grain collector means comprises a trough with the troughs arranged in spaced and parallel relationship spanning the base of said enclosure, and an auger assembly in each of said troughs for removing grain therefrom.

13. The grader according to claim 12 including adjustable baffle means for controlling the direction of the airstream and bleeder means to control the velocity thereof.

14. The grader according to claim 12 in which said separator dust extractor assembly includes bleeder means for controlling the effective efficiency thereof.

15. The grader according to claim 14 including adjustable baffle means for controlling the direction of the airstream and bleeder means to control the velocity thereof.

16. The grader according to claim 15 which includes a even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

17. The grader according to claim 8, 14 or 6 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

18. The grader according to claim 3, 9 or 12 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

19. The grader according to claim 11 including adjustable baffle means for controlling the direction of the airstream and bleeder means to control the velocity thereof.

20. The grader according to claim 10, 19 or 7 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

21. The grader according to claim 11 in which said separator dust extractor assembly includes bleeder means for controlling the effective efficiency thereof.

22. The grader according to claim 13, 5 or 21 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

23. The grader according to claim 1, 2 or 11 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality of partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

24. The grader according to claim 1 including adjustable baffle means for controlling the direction of the airstream and bleeder means to control the velocity thereof.

25. The grader according to claim 4, 24 or 10 which includes an even dispersal assembly operatively connected to said grain hopper means, said even dispersal assembly including a base panel and upwardly extending side walls thereon, an entry port adjacent one end of said base panel, said base panel inclining downwardly from said entry port into said grain hopper means, and a plurality or partitions extending upwardly from said base panel, diverging outwardly from said entry port towards either of said side walls upon each side of the center line of said base panel, baffle means on each partition adjacent the upper ends thereof and means for adjusting the position of the baffle means to control the flow of grain between adjacent partitions.

* * * * *